(12) United States Patent
Fischer (10) Patent No.: US 12,184,770 B2
(45) Date of Patent: Dec. 31, 2024

(54) APPARATUS AND METHOD FOR PRODUCING A MESSAGE AUTHENTICATION CODE

(71) Applicant: Infineon Technologies AG, Neubiberg (DE)

(72) Inventor: Wieland Fischer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 13/746,046

(22) Filed: Jan. 21, 2013

(65) Prior Publication Data
US 2013/0195266 A1    Aug. 1, 2013

(30) Foreign Application Priority Data

Jan. 26, 2012 (DE) .......................... 102012201164.1

(51) Int. Cl.
*H04L 9/08* (2006.01)
*H04L 9/00* (2022.01)
*H04L 9/06* (2006.01)

(52) U.S. Cl.
CPC ............ *H04L 9/0861* (2013.01); *H04L 9/003* (2013.01); *H04L 9/0643* (2013.01); *H04L 2209/046* (2013.01)

(58) Field of Classification Search
CPC ..... H04L 9/003; H04L 9/0861; H04L 9/0643; H04L 2209/046; H04L 9/08; H04L 9/0819; H04L 9/3242; G06F 21/755
USPC ...................................................... 380/44, 47
See application file for complete search history.

(56) References Cited

U.S. PATENT DOCUMENTS

| | | | |
|---|---|---|---|
| 5,511,123 A * | 4/1996 | Adams | ............................ 380/29 |
| 5,651,069 A | 7/1997 | Rogaway | |
| 6,084,969 A * | 7/2000 | Wright | ................ H04L 63/0464 |
| | | | 340/7.21 |
| 7,249,108 B1 * | 7/2007 | Walmsley | ............... H04L 9/003 |
| | | | 713/168 |
| 7,660,998 B2 * | 2/2010 | Walmsley | ............ B41J 2/04505 |
| | | | 713/189 |
| 8,341,417 B1 * | 12/2012 | McGrew | ................. G06F 21/64 |
| | | | 713/181 |

(Continued)

FOREIGN PATENT DOCUMENTS

| | | |
|---|---|---|
| CN | 101820620 A | 9/2010 |
| DE | 102004001490 A1 | 8/2004 |
| DE | 60103737 T2 | 7/2005 |

OTHER PUBLICATIONS

Najjar et al., D-HMAC Dynamic Hmac Function, IEEE, May 27, 2006, pp. 1-8. (Year: 2006).*

(Continued)

*Primary Examiner* — Philip J Chea
*Assistant Examiner* — Jenise E Jackson
(74) *Attorney, Agent, or Firm* — Murphy, Bilak & Homiller, PLLC (57) ABSTRACT

An apparatus for producing a message authentication code based on a first message and an original key is provided. The apparatus includes a key generator configured to produce a generated key based on the original key and the first message. Furthermore, the apparatus includes a message authentication code generator configured to produce the message authentication code based on the generated key and the first message.

21 Claims, 8 Drawing Sheets

(56) References Cited

U.S. PATENT DOCUMENTS

| | | | |
|---|---|---|---|
| 8,392,708 B2* | 3/2013 | Shah | G06F 21/64 713/168 |
| 8,949,607 B2* | 2/2015 | Boesgaard Soerensen | G06F 21/55 713/169 |
| 9,306,741 B1* | 4/2016 | Brainard | H04L 63/08 |
| 2002/0025037 A1* | 2/2002 | Sano | H04L 9/0643 380/44 |
| 2003/0185395 A1* | 10/2003 | Lee et al. | 380/277 |
| 2005/0254658 A1* | 11/2005 | Brown | H04L 9/0825 380/286 |
| 2006/0010324 A1* | 1/2006 | Appenzeller | H04L 9/083 713/171 |
| 2007/0245147 A1* | 10/2007 | Okeya | 713/181 |
| 2007/0282398 A1* | 12/2007 | Healy | A61N 1/37211 607/60 |
| 2007/0291944 A1* | 12/2007 | Wingert | H04L 63/0428 380/258 |
| 2008/0046741 A1* | 2/2008 | Mironov | H04L 9/3236 713/176 |
| 2008/0065777 A1* | 3/2008 | Sherkin | H04L 63/0823 709/229 |
| 2008/0112561 A1* | 5/2008 | Kim et al. | 380/42 |
| 2008/0114983 A1* | 5/2008 | Sherkin et al. | 713/171 |
| 2009/0007275 A1* | 1/2009 | Gehrmann | G06F 21/445 726/27 |
| 2009/0041244 A1* | 2/2009 | Lee et al. | 380/259 |
| 2009/0085780 A1 | 4/2009 | Vijayrangan | |
| 2009/0138708 A1* | 5/2009 | Miyazaki | H04L 63/12 713/168 |
| 2009/0193259 A1* | 7/2009 | Miyazaki | G06F 21/64 713/176 |
| 2009/0193261 A1* | 7/2009 | Yang | G06F 21/572 713/181 |
| 2009/0214028 A1* | 8/2009 | Schneider | H04L 9/0844 380/44 |
| 2009/0222667 A1* | 9/2009 | Vauclair | H04L 9/002 713/175 |
| 2010/0049986 A1* | 2/2010 | Watanabe et al. | 713/181 |
| 2010/0111296 A1* | 5/2010 | Brown | H04L 9/3066 380/28 |
| 2010/0158246 A1* | 6/2010 | Neumann | H04L 9/0838 380/28 |
| 2010/0262840 A1* | 10/2010 | Benteo et al. | 713/190 |
| 2011/0066856 A1* | 3/2011 | Yao | H04L 9/3271 380/278 |
| 2011/0131415 A1* | 6/2011 | Schneider | H04L 9/3226 713/171 |
| 2012/0106735 A1* | 5/2012 | Fukuda | H04L 9/083 380/255 |
| 2012/0243541 A1* | 9/2012 | Zhao | H04L 47/00 370/392 |
| 2012/0311335 A1* | 12/2012 | Fransen | H04L 63/06 713/170 |
| 2012/0311340 A1* | 12/2012 | Naganuma | H04L 9/3242 713/176 |
| 2013/0024691 A1* | 1/2013 | Chowdhury | H04L 63/061 713/168 |
| 2013/0086663 A1* | 4/2013 | Roth | H04L 9/3247 726/7 |
| 2013/0117824 A1* | 5/2013 | Naslund | H04L 9/0841 726/4 |
| 2013/0159714 A1* | 6/2013 | Prestidge | G01B 5/012 713/168 |
| 2013/0254845 A1* | 9/2013 | Boesgaard Soerensen | G06F 21/55 726/3 |
| 2014/0064483 A1* | 3/2014 | Fujisaki | H04L 9/3242 380/44 |
| 2014/0098956 A1* | 4/2014 | Hansen | H04L 63/061 380/270 |
| 2014/0169557 A1* | 6/2014 | Gammel | H04L 9/0668 380/44 |
| 2014/0309018 A1* | 10/2014 | Walker | G07F 17/32 463/25 |
| 2015/0026452 A1* | 1/2015 | Roelse | H04L 63/0428 713/150 |
| 2015/0126157 A1* | 5/2015 | Lee | H04W 12/04 455/411 |

OTHER PUBLICATIONS

Preneel et al., On the Security of Iterated Message Authentication Codes, IEEE, Aug. 6, 2002, pp. 188-189. (Year: 2002).*

Chen, Lily, "Recommendation for Key Derivation Using Pseudorandom Functions (Revised)", NIST Special Publication 800-108, Oct. 2009, Available at http://nvlpubs.nist.gov/nistpubs/Legacy/SP/nistspecialpublication800-108.pdf accessed Aug. 23, 2017.

Krawczyk, H. et al., "HMAC: Keyed-Hashing for Message Authentication", IBM, Network Working Group, Feb. 1997.

Krawczyk, H. et al., "HMAC-based Extract-and-Expand Key Derivation Function (HKDF)", Nokia, Internet Engineering Task Force (IETF), May 2010.

* cited by examiner

APPARATUS AND METHOD FOR PRODUCING A MESSAGE AUTHENTICATION CODE

PRIORITY CLAIM

This application claims priority to German Patent Application No. 10 2012 201 164.1, filed on 26 Jan. 2012, the content of said German application incorporated herein by reference in its entirety.

TECHNICAL FIELD

The present application relates to the production of message authentication codes, and particularly to an apparatus and a method for producing a message authentication code based on a first message and an original key.

BACKGROUND

For more than a decade, side channel attacks, such as simple power analysis (SPA) and differential power analysis (DPA), have been used in order to attack implementations of symmetric block ciphers, which are used by the DES (Data Encryption Standard) encryption algorithm or by the AES (Advanced Encryption Standard) encryption algorithm, for example. Similarly, side channel attacks such as SPA and DPA are used in order to attack asymmetric crypto-algorithms, such as the RSA (Rivest Shamir Adleman) encryption algorithm, and elliptic curve systems. In this context, "attack" means that the attacker extracts the secret key which is used to operate the encryption algorithms.

Crypto-algorithms which are not operated using secret keys, such as hash algorithms, are less affected by side channel attacks, since in this case there are usually no further secrets, such as secret keys, involved but rather it is merely necessary to compress a prescribed piece of information in the form of a message M.

However, there is an application for hash algorithms in which a secret key is used that needs to be prevented from being compromised, namely the calculation of what is known as a message authentication code. The term "message authentication code" is subsequently abbreviated herein as "MAC". An MAC, in coarse terms, is the hash from a secret key k and a message M. In this case, a message authentication code is used not only to safeguard the integrity of a message but additionally also to ensure that this is accomplished only by a party which is in possession of the secret key k.

Figure 7:
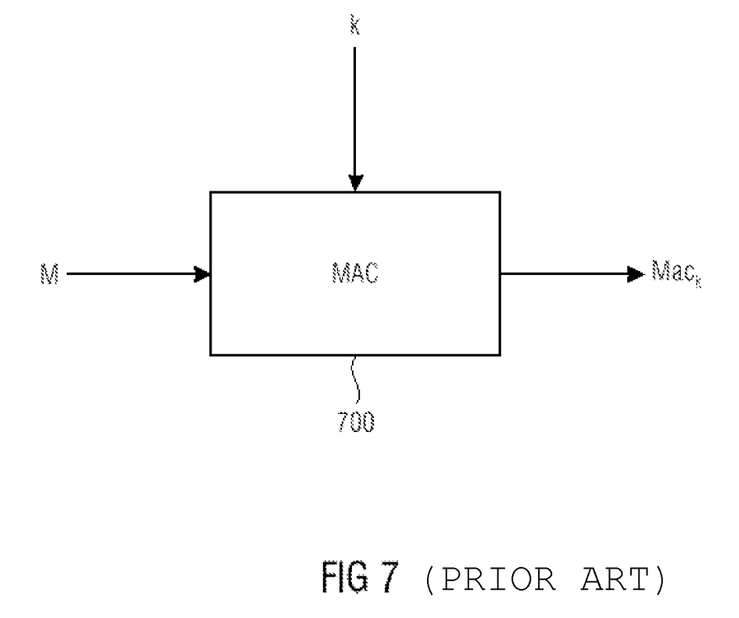
FIG. 7 shows production of a message authentication code according to a conventional approach.

FIG. 7 illustrates MAC generation based on a conventional approach. A piece of information in the form of a message M is input together with a secret key k into an apparatus 700 which executes a MAC algorithm. The apparatus 700 calculates the message authentication code $Mac_k(M)$, which is dependent on the message M and the secret key k.

Since fundamentally any implementation—not specifically tempered against this—of an algorithm which "mixes" a constant secret, such as a secret key, with a variable and known input can be attacked by DPA, this also applies to an MAC calculation.

Side channel attacks often make use of knowledge of the power consumption of a processor for the attack. In the case of many encryption algorithms, the power consumption of a processor when a bit of a key or of an interim result is processed which has the value 1 differs from the power consumption of the processor when a bit of a key or of an interim result is processed which has the value 0. Thus, calculations in encryption algorithms are often executed only when a bit of a key or of an interim result which is dependent on a key assumes the value 1, whereas in the case of a bit value of 0 the calculation is not performed. In this example, this results in a higher power consumption for a bit value of 1 in contrast to when the bit has the value 0. In other cases, by way of example, certain instructions are executed only when a particular bit of a key or of an interim result which is dependent on a key assumes the value 0. This also results in a power consumption of the processor which is different depending on whether a bit has the value 1 or 0. Hence, it is possible, in principle, to draw conclusions about a secret key, or to obtain information about an interim result which is dependent on a secret key and which then in turn permits conclusions about the secret key, if the power consumption of a processor is known. In this way, it is thus sometimes possible to use a side channel attack to determine a secret key which is used by a chip card if the chip card is not protected against side channel attacks. Side channel attacks are not limited to the analysis of the power consumption, however. Side channel attacks can alternatively also analyse other parameters, such as electromagnetic radiation, which may likewise be different based on the bit values of a key or of an interim result which is dependent on a key, for example.

Examples of side channel attacks are simple power analysis, subsequently referred to as "SPA", and differential power analysis, subsequently referred to as "DPA". It is also possible to employ error attacks in order to perform an attack.

In simple terms, SPA works by recording the power consumption of a processor. The recorded current profile is then considered and examined for distinctive features. Thus, during the visual consideration of the current profile, that is to say the power consumption over the course of time, for example, significant differences often arise in the timing. Phases of relatively high power consumption and phases of relatively low power consumption are often clearly distinguishable. If the current profile of a processor which executes a DES encryption algorithm is analysed, for example, then, by way of example, the 16 repeating rounds during the DES encryption are often clearly evident. If the current profile for the identified rounds is then considered more precisely, it is often possible to draw conclusions as to which operations have been performed at which times using which bit values, for example.

Instead of visual consideration of the current profile, for example of a processor, as in the case of SPA, differential power analysis (DPA) makes use of statistical means in order to determine a secret key which is used for an encryption algorithm.

In this case, for a multiplicity of messages that are to be encrypted with a secret key, the respective current profile, that is to say the power consumption of a processor over the course of time, for example, is first of all recorded during the execution of an encryption algorithm and then statistically analysed. By way of example, it is thus possible to use the often present circumstance that interim results which are calculated by the encryption algorithm are frequently dependent only on a portion of the bits of the secret key besides the message to be encrypted.

By way of example, if an interim result, which may be 0 or 1, for example, is dependent only on six bits of 56-bit key then an attacker, given knowledge of the input values, that is to say for the message to be encrypted, for example, could calculate the value of the interim result for all $2^6=64$ different variants for the six relevant bits of the key and then calculate an average current profile, for example for each of the 64 different variants, from all the current profiles for which the interim result assumes a particular value, e.g. the value 1 for a bit that is to be calculated.

There is then a high probability that distinct peculiarities in comparison with the other average current profiles will then arise for the average current profile of the correct variant of the 64 different options for the six bit values, since it is usually the only one for which the messages pertaining to all the current profiles which have been used for calculating the average current profile have actually all led to the same interim result during the encryption of said messages.

In order to prevent DPA attacks, various techniques have been proposed. By way of example, one technique involves adding noise during the performance of operations which use the secret key. A further technique involves the application of masking techniques, such as Boolean masking and arithmetic masking.

In principle, masking techniques involve, prior to the application of an operation using a secret, such as a secret key, first of all masking, i.e. altering, the message to which the secret key is applied. By way of example, the masking can be affected such that individual bits of the message are exchanged in a manner which is unknown to the attacker. A further option is for the message to which the secret key is applied to be altered such that the message is altered by applying a secret bit string, for example by performing an XOR operation which logically combines the message and the secret bit string with one another. Alternatively or in addition, it is also possible to perform AND operations and/or OR operations in order to mask the message. The critical operation for which the secret key is applied is then applied to the masked message in order to obtain the result of the operation. This result is then available in masked form. Accordingly, after the operation has been performed, the masking is reversed again in order to obtain an unmasked result.

An algorithm to be protected in the case of which both Boolean and arithmetic operations need to be protected often requires the frequent conversion of Boolean to arithmetic masking and vice-versa when masking techniques are applied. By way of example, this applies to hash operations in which hashing is applied to a secret bit string and which need to be protected against side channel attacks. For this, such algorithms are protected by masking methods, for example, which either require considerable involvement in terms of computation time, if they are implemented in software, or have an accordingly large surface area requirement, if they are implemented in hardware.

For the calculation of an MAC, hash values are calculated for values which, for their part, have been calculated by using a key that needs to be kept secret. The development of efficiently implementable concepts for preventing side channel attacks which analyses the generation of a message authentication code is desirable in this case.

For conventional protection against side channel attacks, such as DPA, applied to a conventional MAC calculation, as could be effected on a chip card, for example, one would apply the standard techniques, for example, which are also used for protecting DES, AES, RSA, etc., for example. These include masking methods, for example. Since an MAC calculation involves performing a hash compression function multiple times, it would admittedly suffice to make the hash calculations DPA-safe. However, hash calculations can be protected against side channel attacks only with an extremely high level of complexity. If the hash calculation is implemented in a hardware module, the surface area of the design is increased substantially. If the hash calculation is implemented in the software, the computation time of the masked method is increased by a multiple.

SUMMARY

Embodiments described herein provide efficient concepts for protecting MAC production against side channel attacks.

According to one embodiment, an apparatus for producing a message authentication code based on a first message and an original key is provided. The apparatus comprises a key generator configured to produce a generated key based on the original key and the first message. Furthermore, the apparatus comprises a message authentication code generator configured to produce the message authentication code based on the generated key and the first message.

The above embodiment avoids mere combination of the MAC calculation with classical protection concepts against side channel attacks, which would have associated disadvantages.

According to the exemplary embodiment above, the protection problem is relocated to another algorithm, such as a DPA-safe AES operation, or another operation which meets certain conditions and can easily be made DPA-safe.

For example, many hash algorithms are less well suited to DPA-safe implementation as symmetric block ciphers. Conversely, symmetric block ciphers are better suited to DPA-safe implementation than hash algorithms. Relocation of the problem of protection against side channel attacks to a DPA-safe AES operation, for example, as provided for in preferred embodiments, is particularly advantageous because, inter alia, the implementation of AES operations which are DPA-safe is normally present on a chip card anyway. One of the advantages of such a solution is that a piece of hash hardware or software does not need to be implemented in DPA-safe fashion, but instead it is possible to resort to a standard implementation against side channel attacks and/or to an implementation which has been optimized for speed, and which is often present on a chip card anyway, for example.

Furthermore, it is possible to make use of the circumstance that a hash calculation is many times more intensive in terms of time or surface area than a block cipher, or that conversely a block cipher can be made somewhat more efficient in terms of time or surface area than in the case of a hash calculation.

According to one embodiment, the key generator may be configured to produce the generated key by using a cryptographic encryption algorithm.

In a further embodiment, the key generator may be configured to produce the generated key by means of a hash calculation for the first message.

In another embodiment, the key generator may be configured to produce the generated key by performing a hash calculation for a portion of the first message.

According to a further embodiment, the key generator may be configured to produce the generated key such that the entropy of the generated key is not lower than the entropy of the original key.

In a further embodiment, the key generator may be configured to produce the generated key such that when precisely one bit of the first message or of the original key is changed, between 45% and 55% of the bits of the generated key change on average for all the possible keys which have a first predefined bit length and first messages which have a second predefined bit length when the generated key is produced again.

According to a further embodiment, the key generator may be configured to use AES encryption for producing the generated key.

In a further embodiment, the key generator may be configured to apply the formula $AES_k(H(M))$, where M denotes the first message, where H(M) denotes the hash calculation of the first message M, where k denotes the original key and where $AES_k$ denotes an AES encryption using the original key k.

According to another embodiment, the key generator may have protection means which are configured to protect the production of the generated key against side channel attacks. Preferably, the protection means are designed to perform a masking operation for the first message in order to obtain a masked message, wherein the key generator may be configured to produce the generated key based on the original key and the masked first message.

In a further embodiment, the masking operation in this case may comprise exchange of the first message or XORing, ANDing or ORing of the first message with a bit string.

In a further embodiment, the message authentication code generator may be configured to perform a hash calculation for M in order to calculate the message authentication code.

In a further embodiment, the message authentication code generator may be configured to logically combine the generated key with a first constant in a first XOR operation and to logically combine the generated key with a second constant in a second XOR operation.

According to another embodiment, the message authentication code generator may be configured to apply the formula $HMAC_{k'}(M)=H((k'\oplus opad)\|H((k'\oplus ipad)\|M))$, where M denotes the first message, where k' denotes the generated key, where $\oplus$ denotes an XOR operation, where $\|$ denotes a concatenation, and where H denotes a hash operation.

Furthermore, an apparatus for checking correctness and authenticity of a message is provided which comprises an apparatus for producing an ascertained message authentication code and a comparison unit. The comparison unit is configured to check the ascertained message authentication code and a received message authentication code for a match in order to check the correctness and the authenticity of the message.

According to one embodiment, a method for producing a message authentication code based on a first message M and an original key k is provided. A generated key k' is produced, based on the original key k and the message M. A message authentication code is then produced based on the generated key k' and the message M.

In a further embodiment, a method for generating a message authentication code MAC based on a message M with a secret key k is provided. The method comprises the generation of a session key k' from M and k by a method which is collision-resistant in respect of the messages, that is to say a method such that it is cryptographically difficult to find two messages M1 and M2, so that k'(k,M1)=k'(k, M2). The method further comprises using the session key k' in an MAC algorithm in order to produce an MAC from the message M with the generated key k'.

Preferably, the production of the generated key k' involves a hash calculation for the message M.

In addition, it is preferred that a cryptographic encryption algorithm produces a generated key k' as a cipher from the inputs M, or a hash value calculated based on M, and the original key k.

BRIEF DESCRIPTION OF THE DRAWINGS

Preferred embodiments are explained with reference to the drawings, in which.

DETAILED DESCRIPTION

Figure 1:
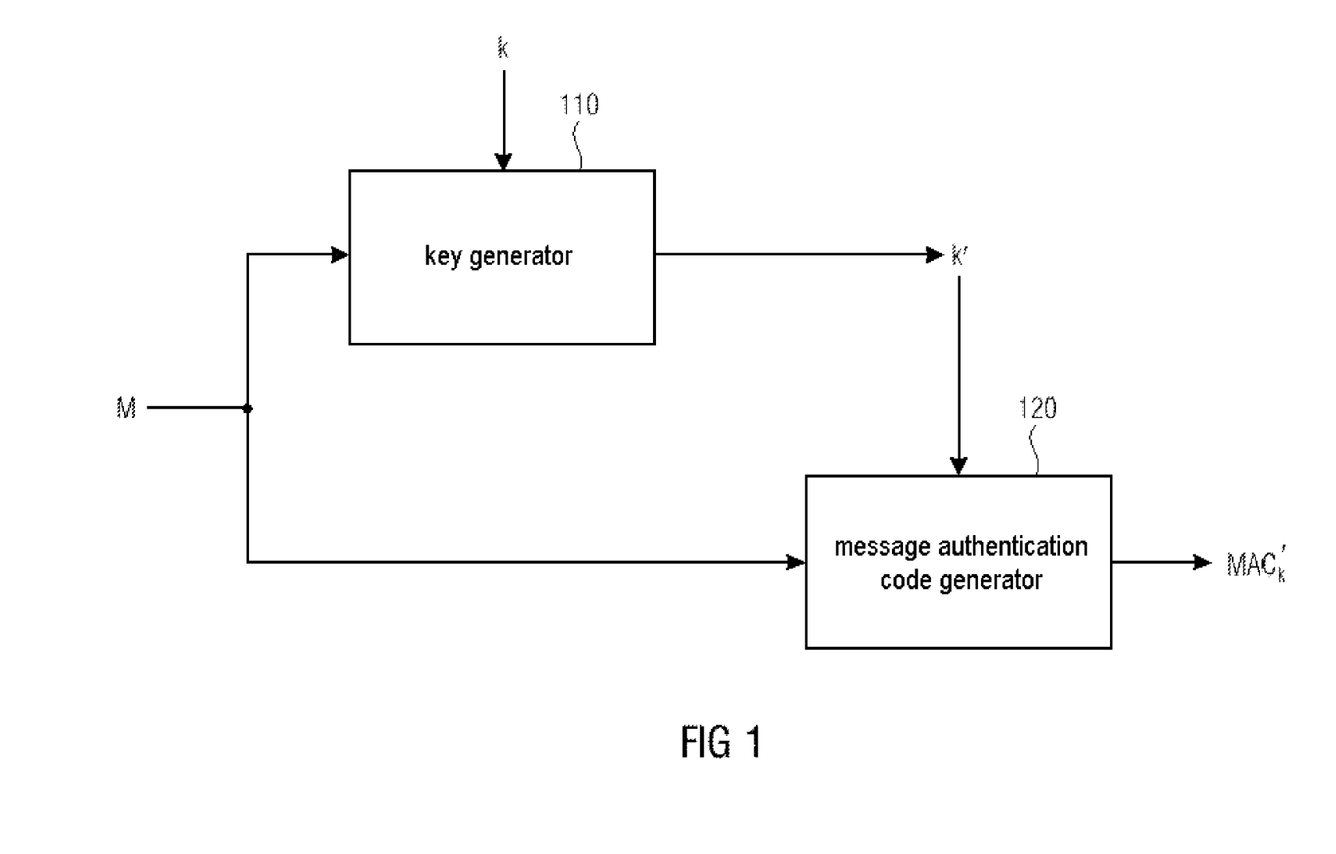
FIG. 1 shows an apparatus for producing a message authentication code based on a first message and an original key according to one embodiment.

FIG. 1 shows an apparatus for producing a message authentication code based on a first message M and an original key k. The apparatus comprises a key generator 110 for producing a generated key k' based on the original key k and the first message M. Furthermore, the apparatus comprises a message authentication code generator 120 for producing the message authentication code $MAC'_{k'}$.

The apparatus receives a message M and the original key k as inputs. The key generator 110 is configured to produce a generated key k' by using the original key k and by using the first message M. This generated key k' is then used to produce the message authentication code.

Preferably, the key generator 110 is set up such that the generated key k' differs from another generated key in most cases when different messages $M_1$ and $M_2$ are coded. Since a side channel attack such as DPA requires a multiplicity of current profiles to be ascertained for a multiplicity of messages given a constant key k, this prerequisite for a successful side channel attack no longer exists in the present embodiment because the key k' which is used for producing the message authentication code is thus almost always different for different messages $M_1$ and $M_2$. Hence, it is no longer possible, or at least is made substantially more difficult, for an attacker to ascertain the key k' used for producing the message authentication code by using DPA.

The embodiment illustrated in FIG. 1 protects the actual generation of the message authentication code, which is effected only based on the generated key k' and the message M, against side channel attacks. In this case, however, the problem of susceptibility to side channel attacks is shifted to a different process, namely to the process for producing the generated key k', which is produced based on the original key k and the message M by the key generator 110. Since the key k comes into contact with the (potentially known) message M in this case too, there is also a DPA problem in this case. Thus, the production of the generated key k' is fundamentally susceptible to side channel attacks which, by way of example, aim to determine the original key k.

Hence, although the present embodiment no longer requires the actual production of the MAC based on the generated key k' and the message M to be protected against side channel attacks, the production of the generated key k' from the original key k and the message M should now be protected against side channel attacks. It is thus necessary to ensure that the derived k'=k'(k,M) is protected against side channel attacks.

The concept of relocating the protection problem, as provided for in the present embodiment, is found to be particularly advantageous in this case, however. It is thus easier to protect the production of the generated key against side channel attacks, such as DPA, than to protect the hash operations when producing the MAC, for example by virtue of the generated key being produced by a block cipher, for example by using an AES encryption algorithm. Such an AES operation is much easier to protect against side channel attacks than the hash operations which are used for the message authentication code production. Furthermore, the production of an MAC for a message requires only one operation to be protected against side channel attacks, whereas the protection of the hash operations for the MAC generation would require a series of operations to be protected against side channel attacks.

When producing the key k', it is possible to use conventional mechanisms in order to protect the production of the generated key k', such as masking or the addition of noise.

In summary, an essential aspect of this embodiment is the replacement of the actual MAC calculation $MAC_k(M)$ using a key k with calculation of the MAC using a variable secret key k'. If this variable key k' is dependent on both the secret key k and the message M itself, and if this is accomplished in cryptographically meaningful fashion, then it is possible to ensure that two different messages M1 and M2 are also MACed using two different derived keys. This can even be ensured when the attacker is capable of determining the messages which are MACed themself. In this case, the MAC from a fixed message always uses the same key k', which means that the MAC is reproducible. However, since this key k' is usually not (or at least as good as never) used to MAC a second message M, it is not possible for k' to be ascertained by DPA.

It is particularly advantageous when the following items a) to e) are complied with:
  a) The cryptographic strength of the system should not be reduced. In other words, the calculation of k' should not reduce an entropy for the key. In certain situations, it is nevertheless possible to tolerate the loss of some bits of entropy, however, for example when the key length is greater than required anyway.
  b) There should be a reaction to every bit of the input, i.e. of the original key k and the message M, for example the production of the generated key should be dependent on every bit of the input.

It is preferred that when an arbitrary bit of the input is inverted, e.g. a bit of the original key k or a bit of the message M, on average between 45% and 55% of the output bits are inverted. In other words, on average between 45% and 55% of the bits in the generated key k' are altered.

It is particularly preferred that an avalanche effect occurs, i.e. on average 50% of the output bits are inverted. In other words, on average 50% of the bits in the generated key k' are altered.

c) It should not be possible to generate another second message M2 for a first message M1, which means that the following applies for the original key k and the generated key k':

$$k'(k,M1)=k'(k,M2)$$

Above all, this should not be possible if k is also not known.

d) It is advantageous if it is not possible to calculate the original key k from the information k' (generated key) and M (message for which the MAC has been calculated).
  e) The calculation of k'=k'(k,M) is not supposed to permit any conclusions concerning k from side channel attacks, even if M is known or even can be chosen.

According to one embodiment, an apparatus is provided which complies with items a) through d).

In one preferred embodiment, an apparatus is provided which complies with items a) through e).

According to one embodiment, an apparatus is provided which is configured to produce a message authentication code by replacing an original key k with a generated key k' which is produced in the following manner:

$$k':=k'(k,M):=AES_k(H(M)).$$

Here, M denotes a message; H denotes a hash operation which is applied to this message in order to obtain the hash value H(M); $AES_k$ denotes an AES encryption algorithm which is used with the original key k in order to encrypt the hash value M; and k' denotes the key to be generated which is produced. Such an apparatus automatically complies with items a) through d).

Item e) can be assured by the implementation. By way of example, a masking concept from the prior art can be used in order to implement item e), such as a known technique for masking the AES encryption algorithm.

Such production of the generated key is particularly advantageous because, inter alia, the hash operation used does not necessarily need to be protected against side channel attacks, since it is applied not to the key k that needs to be protected but rather only to the message M.

When producing the MAC, the AES calculation therefore merely needs to be calculated in side-channel-resistant fashion.

Instead of using the AES algorithm, there are many other options for producing a generated key k'. By way of example, a DES algorithm or a triple-DES algorithm can be used to produce a generated key k'.

Some embodiments comply with items a) through e) possibly only gradually or in part, depending on the case. For example, some embodiments do not absolutely require the use of a strong encryption algorithm.

Figure 2:
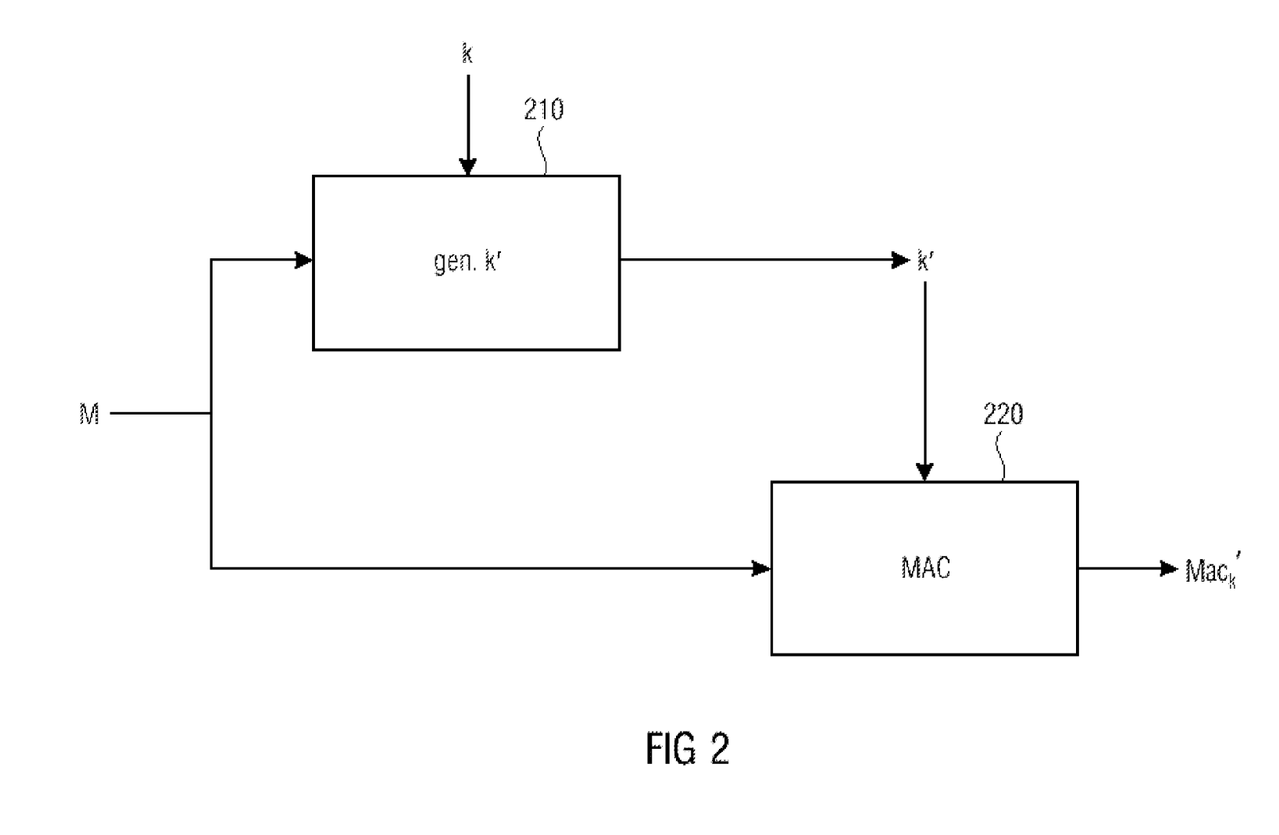
FIG. 2 shows an apparatus for producing a message authentication code based on a first message and an original key according to a further embodiment.

In this case, FIG. 2 now provides an embodiment which permits safe MAC calculation. According to the novel concept, a generated key, e.g. a session key k', is first of all produced from the message M and an original key k by a key generator 210. The session key is then used by a message authentication code generator 220 in order to produce the message authentication code $Mac'_{k'}$.

Figure 3:
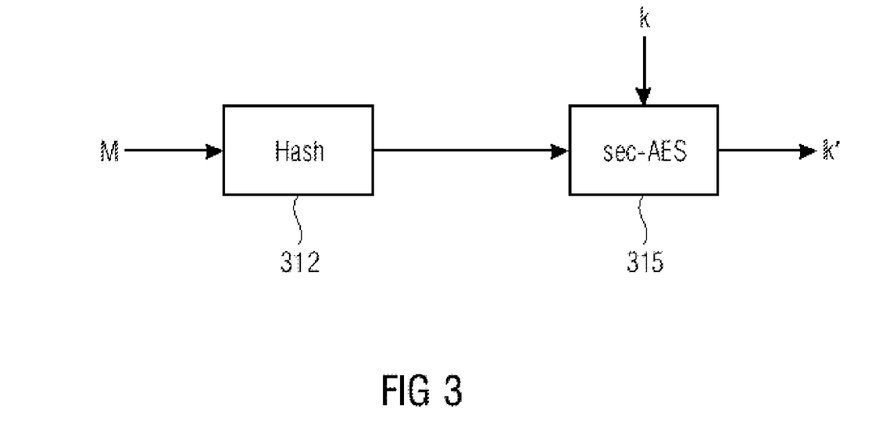
FIG. 3 shows an apparatus for producing a generated key based on a first message and an original key according to one embodiment.

FIG. 3 shows an embodiment for the production of the generated key, e.g. a session key k'. By way of example, the session key k' can be produced by hashing the message M in a first module 312. In that case, the result can be encrypted using the key k, for example by using an AES that is protected against side channel attacks, in a second module 315.

According to a further embodiment, the session key k' can be produced by hashing a portion of the message M in the first module 312, for example. In that case, the result can be encrypted using the key k, e.g. by using an AES that is protected against side channel attacks, in the second module 315.

There are many other options for producing a generated key which is protected against side channel attacks, so long as items a) through e) as described above are observed.

The text below presents a further embodiment of the present invention which relates to the HMAC (hash-based message authentication code). First of all, however, the HMAC message authentication code, as known from the prior art, will be explained with reference to FIG. 8 as an aid to understanding. This involves supplying a piece of information in the form of a message M together with a secret key to an apparatus which executes an MAC algorithm. The apparatus calculates the message authentication code.

Figure 8:
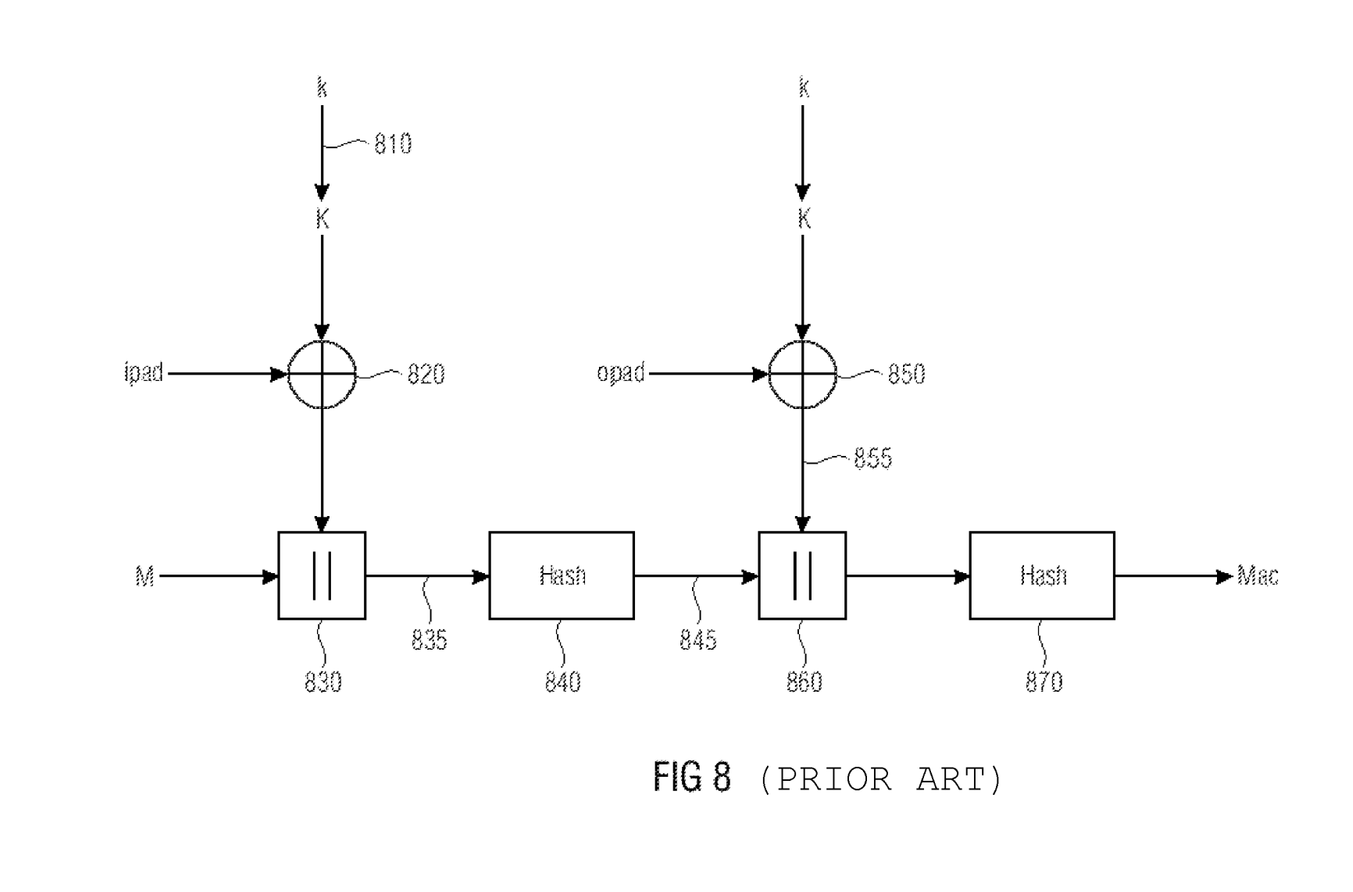
FIG. 8 shows production of an HMAC according to a conventional approach.

The apparatus in FIG. 8 possibly shortens an original key k, if the key is too long, in order to obtain a key K (step 810). If it is not necessary to shorten the key k, the key k is adopted without alteration as key K. Next, the key K is XORed (820) with a bit string ipad. The result is then concatenated (830) with the message M in order to obtain a first concatenated result which is provided in step 835 for a first hash operation. The first hash operation is then applied (840) to the first concatenated result in order to obtain a first hash result which is provided in step 845 for a second concatenation 860.

In a further step 850, the key K is XORed with a further bit string opad and is then provided by step 855 likewise for the second concatenation 860. The result of this XORing, as provided in step 855, is then concatenated (860) with the first hash result provided in step 845. A second hash operation is then applied (870) to the result of the second concatenation 860, as a result of which the message authentication code Mac is finally obtained.

The customary hash function on which the HMAC method is based is defined by H:$\{0,1\}^* \rightarrow \{0,1\}^l$ of output length l.

By way of example, known hash methods are SHA-1, the SHA-2 family (SHA=Secure Hash Algorithm), comprising SHA256, SHA384, SHA512. A hash of this type comprises in essence a round function h:

$\{0,1\}^L \times \{0,1\}^l \rightarrow \{0,1\}^l$, where $L \geq 1$.

By way of example, for SHA-1: L=512, l=180. The round function is applied iteratively in order to hash messages of arbitrary length.

As already illustrated in FIG. 8, the HMAC for the message M with the secret key K is then defined as $HMAC_K(M)=H((K \oplus opad)||H((K \oplus ipad)||M))$, where opad and ipad are constants, $\oplus$ represents an XOR operation and where $||$ represents a simple concatenation. That is to say that first of all K is hashed together with the message M, and the result is then hashed again together with K. In this case, K has been filled to the input length of the hash H, that is to say, by way of example, K:=k||0 . . . 0.

An MAC algorithm can therefore be produced by HMAC, for example, using a customary hash algorithm. To this end, the message is first of all hashed together with the key k in padded form. The hash is then once again hashed with the key k.

Figure 4:
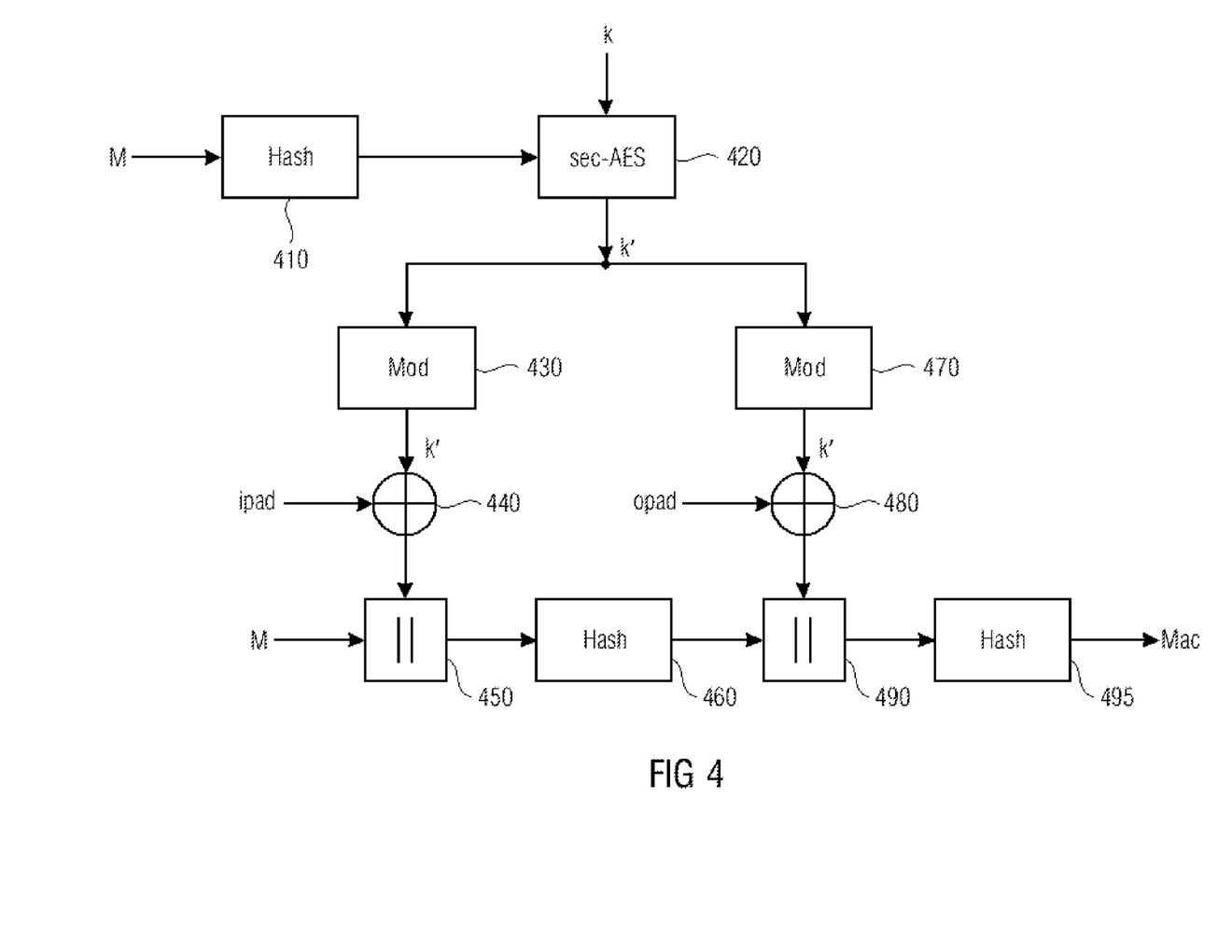
FIG. 4 shows an apparatus for producing a message authentication code by using HMAC based on a first message and an original key according to a further embodiment.

FIG. 4 shows an embodiment of an apparatus in which a message authentication code is produced by means of an HMAC.

The apparatus is designed to produce a generated key k' by hashing a message M in a first hash unit 410 in order to obtain a first hash result, wherein an AES unit 420 is provided, this being designed to encrypt the first hash result with the key k by using an AES algorithm which is protected against side channel attacks.

A first modifier 430 and a second modifier 470 are provided for the purpose of possibly shortening the generated key k' if this key is too long, in order to obtain a key K'. If it is not necessary to shorten the generated key k', the generated key k' is adopted without alteration as key K'. A first XOR unit 440 is provided in order to XOR the key K' with a bit string ipad, in order to obtain a first XOR result. A first concatenation unit 450 is provided in order to concatenate the first XOR result with the message M, in order to obtain a first concatenated result.

Furthermore, a second hash unit 460 is provided for the purpose of applying a hash operation to the first concatenated result, in order to obtain a second hash result.

A second XOR module 480 is configured to XOR the key K' with a further bit string opad, in order to obtain a second XOR result. A second concatenation unit 490 is provided for the purpose of logically combining the second hash result and the second XOR result, in order to obtain a second concatenated result. In addition, a third hash unit 495 is provided for the purpose of applying a hash operation to the second concatenated result, in order to obtain the message authentication code Mac.

Figure 5:
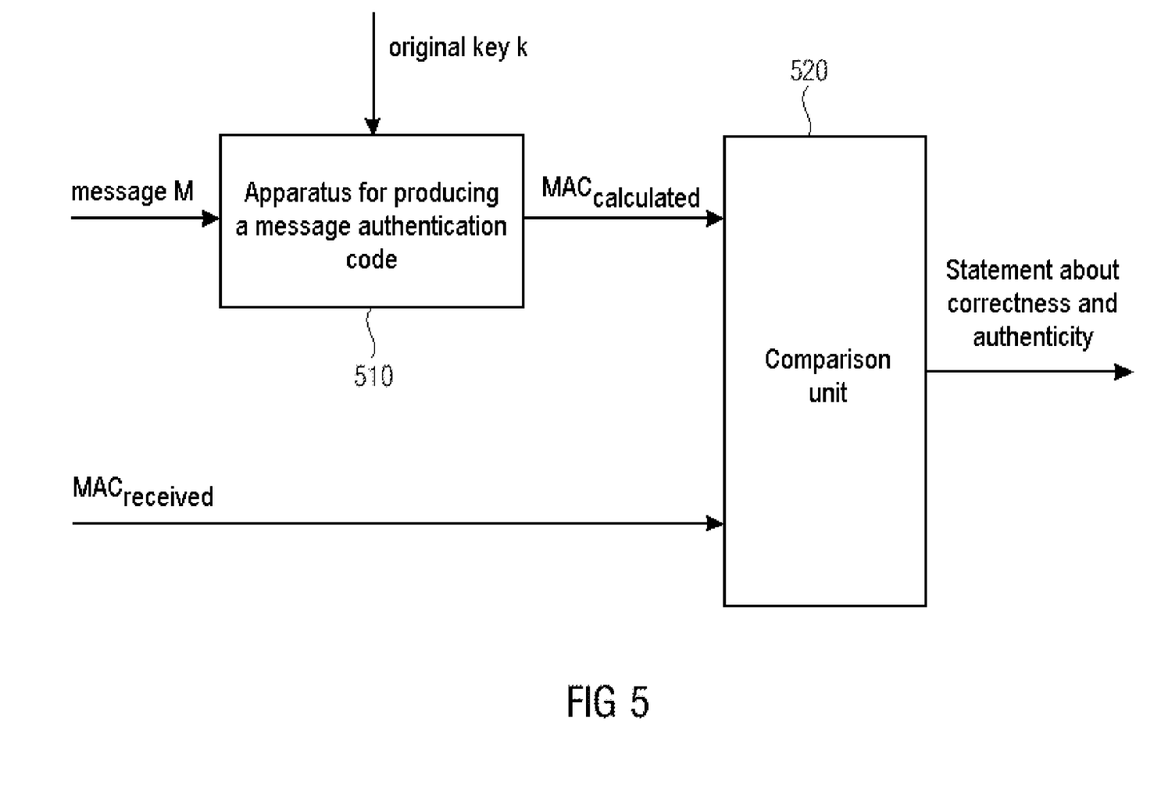
FIG. 5 shows an apparatus for checking correctness and authenticity for a message according to one embodiment.

FIG. 5 shows an apparatus for checking correctness and authenticity for a message. The apparatus is configured to check a message for correctness and authenticity by using a received message authentication code $MAC_{received}$. To this end, the apparatus for checking correctness and authenticity of the message has an apparatus 510 for producing a message authentication code according to one of the embodiments described above and a comparison unit 520.

The apparatus 510 for producing the message authentication code produces a calculated message authentication code $MAC_{calculated}$ based on an (original) key and a message M.

The comparison unit 520 is configured to check the produced message authentication code $MAC_{calculated}$ and the received message authentication code $MAC_{received}$ for a match in order to check the correctness and the authenticity of the message. If $MAC_{calculated}$ and $MAC_{received}$ are identical, it is assumed that the message is correct and authentic. If $MAC_{calculated}$ and $MAC_{received}$ are not identical, it is assumed that the message is not correct and/or that it is not authentic.

Figure 6:
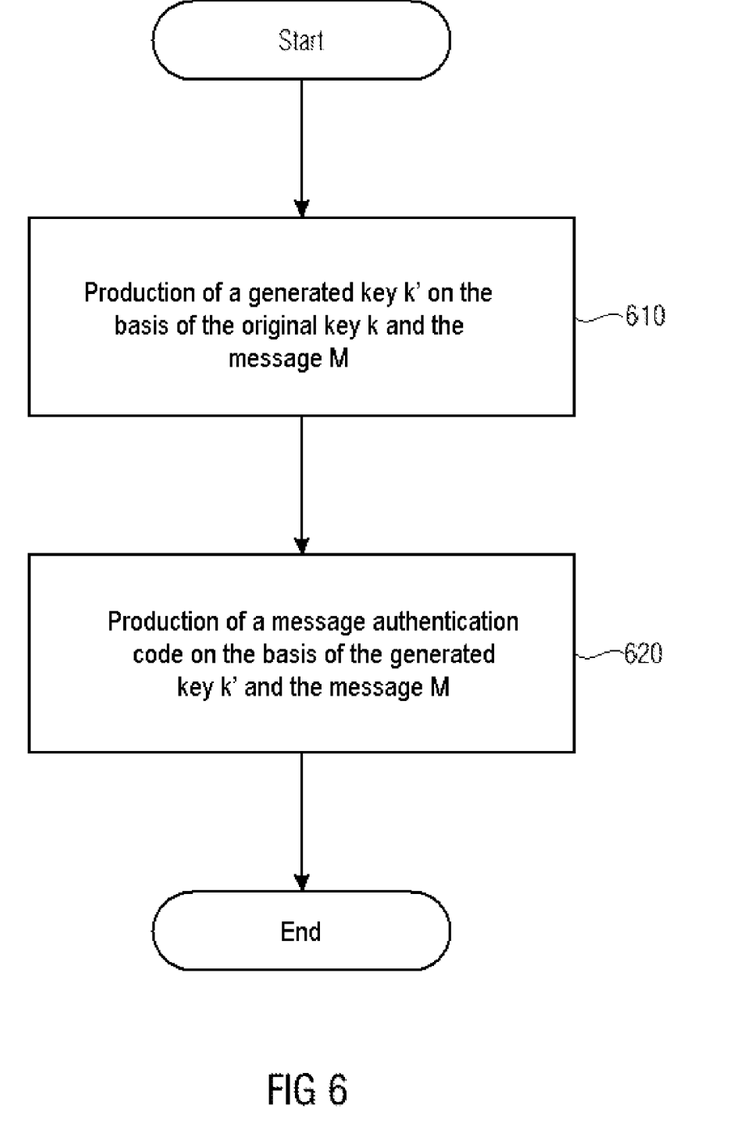
FIG. 6 shows a flowchart which illustrates a method for producing a message authentication code based on a first message and an original key according to a further embodiment.

FIG. 6 shows a method for producing a message authentication code based on a first message M and an original key k according to one embodiment. In step 610, a generated key k' is produced, based on the original key k and the message M. In step 620, a message authentication code is then produced based on the generated key k' and the message M.

Although some aspects have been described in connection with an apparatus, these aspects are also a description of the corresponding method, which means that a block or an element of an apparatus can also be understood as a corresponding method step or as a feature of a method step. Similarly, aspects which have been described in connection with or as a method step are also a description of a corresponding block or detail or feature of a corresponding apparatus. Some or all of the method steps can be executed by a hardware apparatus (or by using a hardware apparatus), such as a microprocessor, a programmable computer or an electronic circuit. In some exemplary embodiments, some or a plurality of the most important method steps can be executed by such an apparatus.

Depending on particular implementation requirements, exemplary embodiments of the invention may be implemented in hardware or in software. The implementation can be carried out by using a digital storage medium, for example a floppy disc, a DVD, a Blu-ray disc, a CD, a ROM, a PROM, an EPROM, an EEPROM or a FLASH memory, a hard disc or another magnetic or optical memory which stores electronically readable control signals which can interact, or interact, with a programmable computer system such that the respective method is carried out. Therefore, the digital storage medium may be computer-readable.

Some exemplary embodiments thus comprise a data storage medium which has electronically readable control signals capable of interacting with a programmable computer system such that one of the methods described herein is carried out.

Generally, exemplary embodiments may be implemented as a computer program product with a program code, the program code being operative so as to carry out one of the methods when the computer program product is executed on a computer.

By way of example, the program code may also be stored on a machine-readable storage medium.

Other exemplary embodiments comprise the computer program for carrying out one of the methods described herein, wherein the computer program is stored on a machine-readable storage medium.

In other words, one exemplary embodiment of the method is therefore a computer program which has a program code for carrying out one of the methods described herein when the computer program is executed on a computer.

A further exemplary embodiment of the methods is a data storage medium (or a digital storage medium or a computer-readable medium) on which the computer program for carrying out one of the methods described herein is recorded.

A further exemplary embodiment of the method is a data stream or a sequence of signals which represent(s) the computer program for carrying out one of the methods described herein. The data stream or the sequence of signals may be configured, by way of example, to be transferred via a data communication link, for example via the Internet.

A further exemplary embodiment comprises a processing device, for example a computer or a programmable logic element, which is configured or customized to carry out one of the methods described herein.

A further exemplary embodiment comprises a computer on which the computer program for carrying out one of the methods described herein is installed.

A further exemplary embodiment comprises an apparatus or a system designed to transmit a computer program for carrying out at least one of the methods described herein to a receiver. The transmission can take place electronically or optically, for example. The receiver may be a computer, a mobile device, a memory device or a similar apparatus, for example. The apparatus or the system may comprise a file server for transmitting the computer program to the receiver, for example.

In some exemplary embodiments, a programmable logic element (for example a field-programmable gate array, an FPGA) can be used to carry out some or all functionalities of the methods described herein. In some exemplary embodiments, a field-programmable gate array can interact with a microprocessor in order to carry out one of the methods described herein. Generally, the methods in some exemplary embodiments are carried out by an arbitrary hardware apparatus. This may be a universally useable piece of hardware such as a computer processor (CPU) or hardware which is specific to the method, such as an ASIC.

The exemplary embodiments described above are merely an illustration of the principles of the present invention. Modifications and variations of the arrangements and details described herein will be apparent to other persons skilled in the art. It is therefore intended that the invention be limited only by the scope of protection of the patent claims which follow and not by the specific details which have been presented herein by means of the description and the explanation of the exemplary embodiments.

What is claimed is:

1. An apparatus for producing a message authentication code based on a first message and an original key, comprising:
   a key generator circuit configured to produce a generated key based on the original key and the whole first message, using a key generation method that is at least collision-resistant with respect to messages input to the key generation method; and
   a message authentication code (MAC) generator circuit configured to produce the message authentication code based on the generated key and the whole first message;
   wherein the key generator circuit is configured to produce the generated key such that when precisely one bit of the whole first message or of the original key is changed, between 45% and 55% of the bits of the generated key change on average when the generated key is produced again.

2. The apparatus according to claim 1, wherein the key generator circuit is configured to produce the generated key by using a cryptographic encryption algorithm.

3. The apparatus according to claim 1, wherein the key generator circuit is configured to produce the generated key by a hash calculation performed using the entirety of the first message.

4. The apparatus according to claim 1, wherein the key generator circuit is configured to produce the generated key such that an entropy of the generated key is not lower than the entropy of the original key.

5. The apparatus according to claim 1, wherein the key generator circuit is configured to use AES (advanced encryption standard) encryption for producing the generated key.

6. The apparatus according to claim 5, wherein the key generator circuit is configured to apply AESk(H(M)), where M denotes the whole first message, H(M) denotes the hash calculation of the whole first message M, k denotes the original key and AESk denotes an AES encryption using the original key k.

7. The apparatus according to claim 1, wherein the key generator circuit is configured to protect against side channel attacks during the production of the generated key.

8. The apparatus according to claim 7, wherein the key generator circuit is configured to perform a masking operation for the whole first message in order to obtain a masked message, and produce the generated key based on the original key and the masked message.

9. The apparatus according to claim 8, wherein the masking operation comprises exchange of bits of the whole first message or XORing, ANDing or ORing of the whole first message with a bit string.

10. The apparatus according to claim 1, wherein the message authentication code generator circuit is configured to perform a hash calculation for the whole first message to produce the message authentication code.

11. The apparatus according to claim 10, wherein the message authentication code generator circuit is configured to use a first XOR operation to logically combine the generated key with a first constant, and use a second XOR operation to logically combine the generated key with a second constant.

12. The apparatus according to claim 11, wherein the message authentication code generator circuit is configured to apply $HMACK'(M)=H((k'\oplus opad)\|H((k'\oplus ipad)\|M))$ in order to calculate the message authentication code, where M is the whole first message, k' is the generated key, $\oplus$ is an XOR operation, $\|$ is a concatenation and H is a hash operation.

13. The apparatus of claim 1, wherein the key generation method is such that it is not possible to generate the same generated key for two different possible first messages.

14. An apparatus for checking correctness and authenticity of a first message, comprising:
  a key generator circuit configured to produce a generated key based on the original key and the whole first message, using a key generation method that is at least collision-resistant with respect to messages input to the key generation method;
  a message authentication code (MAC) generator circuit configured to produce the message authentication code based on the generated key and the whole first message; and
  a comparison circuit configured to check the message authentication code and a received message authentication code for a match in order to check correctness and authenticity of the whole first message;
  wherein the key generator circuit is configured to produce the generated key such that when precisely one bit of the whole first message or of the original key is changed, between 45% and 55% of the bits of the generated key change on average when the generated key is produced again.

15. A method for producing a message authentication code based on a first message and an original key, the method comprising:
  producing a generated key based on the original key and the whole first message, using a hardware-based key generation method that is at least collision-resistant with respect to messages input to the key generation method; and
  producing the message authentication code based on the generated key and the whole first message;
  wherein the key generator circuit is configured to produce the generated key such that when precisely one bit of the whole first message or of the original key is changed, between 45% and 55% of the bits of the generated key change on average when the generated key is produced again.

16. The method according to claim 15, wherein the generated key is produced by using a cryptographic encryption algorithm.

17. The method according to claim 15, wherein the generated key is produced by a hash calculation performed using the entirety of the first message.

18. The method according to claim 15, wherein the message authentication code is calculated by applying $HMACk'(M)=H((k'\oplus opad)\|H((k'\oplus ipad)\|M))$, where M is the whole first message, k' is the generated key, $\oplus$ is an XOR operation, $\|$ is a concatenation and H is a hash operation.

19. The method according to claim 15, further comprising checking the message authentication code and a received message authentication code for a match in order to check correctness and authenticity of the whole first message.

20. The method of claim 15, wherein the key generation method is such that it is not possible to generate the same generated key for two different possible first messages.

21. The apparatus of claim 14, wherein the key generation method is such that it is not possible to generate the same generated key for two different possible first messages.

* * * * *

UNITED STATES PATENT AND TRADEMARK OFFICE
CERTIFICATE OF CORRECTION

PATENT NO. : 12,184,770 B2  
APPLICATION NO. : 13/746046  
DATED : December 31, 2024  
INVENTOR(S) : Fischer Page 1 of 1

It is certified that error appears in the above-identified patent and that said Letters Patent is hereby corrected as shown below:

In the Claims

Column 13, Line 13 (Claim 12, Line 3) please change "HMACK" to -- HMACk --

Signed and Sealed this  
Second Day of December, 2025

John A. Squires  
*Director of the United States Patent and Trademark Office*